March 15, 1960 J. T. ANDERSON 2,928,522
ARTICLE HANDLING APPARATUS AND SYSTEM
Filed Dec. 28, 1955 7 Sheets-Sheet 1

INVENTOR
JOHN T. ANDERSON

BY
Cushman, Darby & Cushman
ATTORNEYS

FIG. 7.

March 15, 1960 J. T. ANDERSON 2,928,522
ARTICLE HANDLING APPARATUS AND SYSTEM
Filed Dec. 28, 1955 7 Sheets-Sheet 4

INVENTOR
JOHN T. ANDERSON

BY *Cushman, Darby & Cushman*
ATTORNEYS

March 15, 1960 J. T. ANDERSON 2,928,522
ARTICLE HANDLING APPARATUS AND SYSTEM
Filed Dec. 28, 1955 7 Sheets-Sheet 7

INVENTOR
JOHN T. ANDERSON
BY Cushman, Darby & Cushman
ATTORNEYS

United States Patent Office 2,928,522
Patented Mar. 15, 1960

2,928,522

ARTICLE HANDLING APPARATUS AND SYSTEM

John T. Anderson, Orlando, Fla., assignor to Crown Cork & Seal Company, Inc., Baltimore, Md., a corporation of New York Application December 28, 1955, Serial No. 555,946

7 Claims. (Cl. 198—43)

The present invention relates to article handling apparatus and, more particularly, to structures and systems for handling unfilled packing cans.

An important current problem in the can making and can-filling industry arises from the fact that cans cannot be handled in accordance with the output of a can making plant or the requirements of a can packing and closing plant without extremely expensive equipment or considerable labor cost. In somewhat more detail, some commonly used can making machinery, that is, machinery to make a can body and place one end thereon, has an output of the order of two hundred cans a minute, while machines to fill the cans and then apply and seam the other end upon the can operate at a comparable speed. Very few packing plants, that is, filling and closing plants, are immediately adjacent a can making plant and, therefore, a tremendous problem is involved at the can making plant in packing the cans for transportation at such a rate as to keep pace with the output of the can making machinery. The same problem arises when the cans reach the can packing plant where they must be unloaded and positioned upright to move into the can filling machinery.

By some methods now in use, cans are loaded at random in large open-bottom crates of a size comparable to that of a trailer truck body. When the truck reaches the packing plant, the crate is gradually withdrawn from the truck so that the cans will fall successively out of the open bottom of the crate into an unscrambling apparatus which places them upright for movement to a filling machine. A principal difficulty with this procedure is the cost of the unscrambling apparatus, bearing in mind that most can packing plants operate only during a portion of the year.

Another system now in use is that of placing the cans at random in large bags which are transported and unloaded into an unscrambler at the packing plant.

While the matter of transporting cans in random fashion largely eliminates any careful handling of the cans at the can making plant, nevertheless, as indicated above, it greatly increases the cost of the installation at the can packing plant and can damage the open ends of the cans so that they become out of round, thereby affecting the seaming operation.

The prior systems discussed above only are practicable when the packing plant is located within fifteen to twenty miles of the can making plant, so as not to require too many trucks. Where cans are to be moved over greater distances, and especially where the cans are of a size larger than six ounces, it is customary to stack the cans within a box car or truck, the stacking usually being performed by the use of large can handling forks and unloading being accomplished in the same manner. Can stacks in tiers will not require unscrambling apparatus, but manual labor in stacking and unstacking is a serious problem because it usually is necessary to employ at least two men to stack cans in a truck or car in pace with the output of one can making machine.

An object of the present invention is to provide a carrier by means of which tin cans or other articles having characteristics generally similar to tin cans readily may be packed in orderly fashion, transported, and unloaded without any substantial degree of manual handling.

Another object of the invention is to provide a carrier useful to attain the above stated object.

A still further object of the invention is to provide a carrier for transporting cans or the like and which is of such construction that the cans will be maintained in a fixed position therein for readily and orderly discharge directly to a can filling and closing machine.

Another object of the invention is to provide a means to fill cans or the like into the carrier of the invention.

A still further object of the invention is to provide a discharge mechanism for use with the carrier of the invention.

A further object of the invention is to provide a carrier which will automatically discharge its load of cans or the like.

Another object of the invention is to provide a discharge mechanism for compartmented or cellular carriers and which will automatically successively empty the compartments.

Still another object of the invention is the provision of discharge station systems whereby trucks or other carriers, including the carriers of the present invention, readily can be handled for discharge of articles.

Other objects and advantages of the invention will be apparent from the following specification and accompanying drawings.

Referring to the accompanying drawings.

Figures 1 to 4 illustrate a form of carrier included in the present invention, such carrier being designated by the numeral 20. As appears in Figure 1, the carrier 20 will include frame elements 21 at its vertical and bottom corners, these frame elements being joined by diagonal strips 22. The bottom frame members 21 have strips 23 secured thereto to support the bottom wall of the carrier above any floor surface so that, if desired, the carrier may be lifted from a floor by a fork truck.

Figures 2, 3:
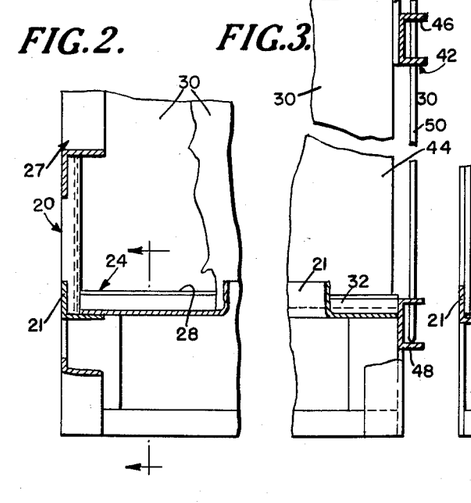
Figure 2 is a fragmentary sectional view through the rearward portion of the carrier, the section being taken in a plane parallel to the plane of the paper.
Figure 3 is a fragmentary sectional view of the front portion of the carrier, the section being taken in a plane parallel to the plane of the paper.
Figure 4:
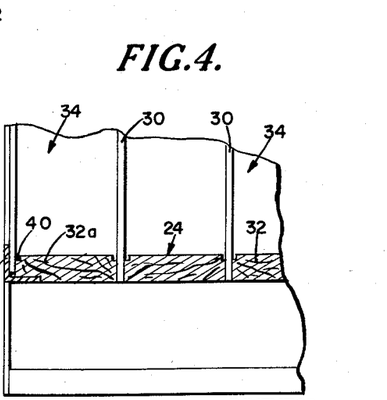
Figure 4 is a fragmentary sectional view on the line 4—4 of Figure 2.

Carrier 20 includes a bottom wall 24, two side walls 25, a front or discharge-opening wall 26 and a rear wall 27. All of the above-mentioned walls, including bottom wall 24, may be formed of one or more strips of material provided with grooves properly spaced to receive the opposite edges of partition plates or elements 30. However, as is indicated in Figures 3 and 4, the preferred structure involves the provision of separate strips 32, for example, wood strips, to form the bottom wall 24 as well as the front and rear walls 26 and 27, respectively. In general, the design of the carrier is such that a plurality of equidistantly spaced partition elements 30 will be included in the structure to run parallel to the side wall elements 25, so that two adjacent partition or side wall elements and the portions of the front, rear and bottom wall elements included therebetween will form a cell designated 34.

If separate strips 32 are to be used to form the bottom walls, the front and rear ends of the strips will lie on the forward and rearward lower frame elements 21 and the two bottom strips 32a (Figure 4) nearest the side walls 25 also will lie on the frame elements 21 at the lower side edges of the carrier. A partition element 30 then will lie between each two adjacent spacer strips 32 to thereby space the partition elements 30 apart and hold them at the proper spacing.

Figure 1:
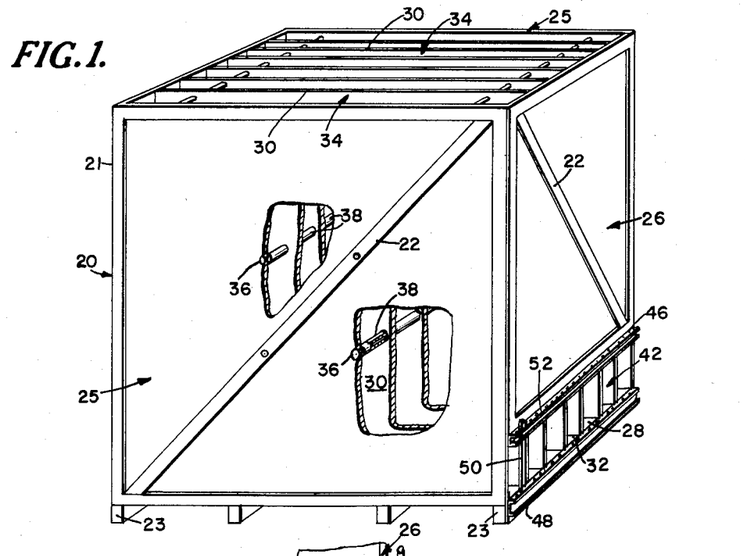
Figure 1 is a perspective view of an article carrier of the invention with portions broken away.

The partition elements 30 may be formed of sheet metal of suitable strength, of wooden veneer, or of composition material such as Masonite. In any event, if the carrier is of the size generally contemplated by the invention so that the partition elements are formed of material of the order of 8' x 8', it is desirable to provide an arrangement of spacing rod elements in a pattern such as indicated in Figure 1 to thereby hold the partition elements and side walls with sufficient rigidity. In more detail, as shown in Figure 1, a plurality of metal rods 36 may be arranged in a rectangular pattern at the central portion of side walls 25 and partition elements 30, the rods 36 extending through aligned apertures in the side walls and partition elements. Sleeves such as 38 may be positioned on each rod 36 to properly space the partition elements from each other and from the side walls 25.

As is hereinafter explained, each cell 34 may be filled with a plurality of articles; for example, tin packers cans including but one end wall so as to be ready for filling and seaming may be placed within each of the cells 34 by apparatus and procedure such as hereinafter described. Assuming that the cans to be handled are six ounce cans such as are used for frozen fruit juice, and that the carrier includes partition elements 30 of the size indicated above, approximately two thousand six ounce cans can be placed in each cell 34.

In order that the flange at the end of each can body will be accommodated in the bottom wall of a cell, the strips 32 and 32a (Figure 4) may be grooved at their side edges as indicated at 40 in Figure 4.

As best shown in Figures 1 and 3, the bottom portion of the front wall 26 of a carrier 20 is so cut away or of such dimensions as to provide an article discharge opening generally designated 42 at the lower portion of the carrier and through which each of the cells 34 may discharge. It will be noted that the partition elements 30 extend downwardly to the bottom edge of the opening 42 as indicated in Figure 3, the forward edges 44 of the partition elements simply extending across opening 42.

The upper and lower edges of the opening 42 are defined by an upper strip 46 and a lower strip 48 preferably of metal and of U-shaped section, the upper strip 46 having both its flanges perforated to receive closure devices such as 50 of pin-like form. Only the upper flange of the lower strip 48 may be perforated so that the lower ends of the closure devices 50 will rest thereon.

In Figure 1 the apertures in the strips 46 and 48 for the closure pins 50 are designated 52 and it will be observed that the apertures 52 are so spaced that a plurality of them will be between the partition elements 30 when the latter are spaced as shown in Figure 1. By this arrangement, more than one closure pin 50 may be provided for each cell. In addition, the invention contemplates that a given frame structure may have its partition elements 30 and spacer strips 32 removable and replaceable so that cells 34 of various widths may be provided to thereby handle articles such as packing cans of various sizes. If the frame elements 21 of Figure 1 carry wider or narrower spacer strips 32 than those shown, and to thereby handle cans of greater or lesser height, that is, axial length, the apertures 52 in the members 46 and 48 are so arranged that one or more closure pins 50 still can be positioned at each cell outlet, and preferably at a point substantially midway of the width of the cell.

Figures 5, 6:
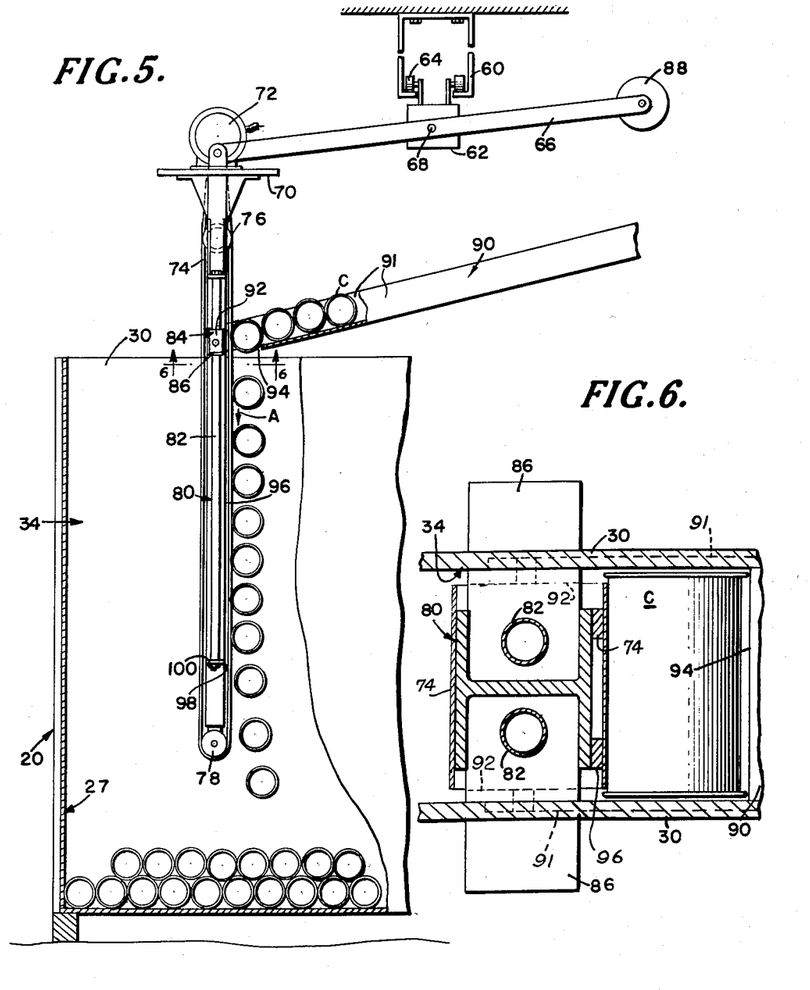
Figure 5 is an elevation of an apparatus for delivering articles such as empty cans to a carrier of the invention.
Figure 6 is a horizontal section on the line 6—6 of Figure 5.
Figure 11:
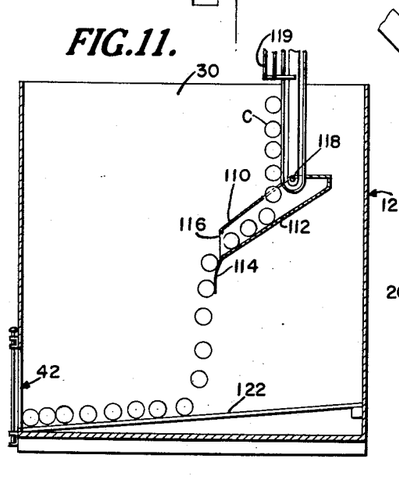
Figures 11 and 12 illustrate alternative procedures for delivering cans to the carrier.
Figure 12:
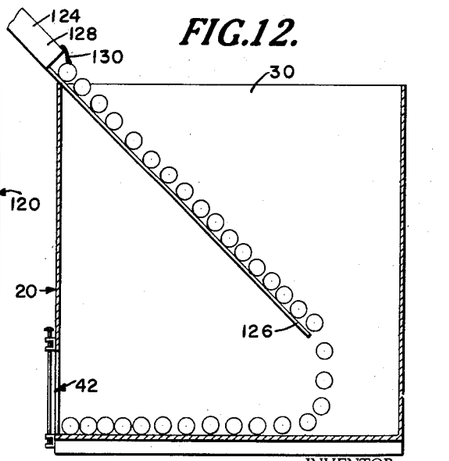

Various procedures may be used to rapidly fill the carrier with the cans or other articles and several such arrangements are shown in Figures 5, 11 and 12. Referring to Figure 5, the carrier 20 is shown resting on the floor of a plant beneath an overhead track 60 which extends transversely of the plane of the partition walls 30. A carriage 62 provided with rollers 64 is movable along the track 60. Carriage 62 has a lever 66 pivoted thereon at 68. One end of the lever 66 pivotally carries a body plate 70 on which a motor 72 is mounted, and also suitable gearing to drive a pulley 76 and thereby a belt 74 formed of canvas or other material necessary to meet the requirements set forth below. Belt 74 will move on the upper pulley 76 and about a lower pulley 78 journaled at the lower end of an angle bar frame generally indicated at 80 and having a pair of vertically extending slide rods 82 fixed thereto in the relation shown in Figure 6. As indicated in the upper portion of Figure 5, a slide element 84 is vertically movable on the rods 82, slide element 84 including a pair of horizontally extending plates 86 which, together, are of sufficient width to bear upon the top edges of at least two partition elements 30 as shown in Figure 6. The plates 86 are secured together as hereinafter described.

The lever 66 has a counter-weight 88 at its opposite end, and which counter-weight balances the weight of the structure at the other end of the lever, as well as such weight as may be imparted thereto by a can supply chute 90 which delivers cans designated C from a can making line. Conveyor 90 is pivotally connected to vertical plates 92 respectively secured to each plate 86 of the slide element 84 and, therefor, the chute 90 secures the plates 86 together for movement of the slide rods 82.

Chute 90 has its bottom wall cut away as indicated at 94 in Figures 5 and 6 so that cans C moving along the chute may move through opening 94 and into contact with the canvas belt 74 which is moving in the direction of the arrow A. Assuming belt 74 is being driven by motor 72 and cans are moving down the chute 90, the cans will successively contact with the downwardly moving canvas belt 74 and will be held in contact with that belt during its downward run by reason of the provision of magnetic bars 96 fixed along that run, the bars extending from a point opposite the end of the chute 90 to a lower point such as indicated at 98. When the belt 74 carries a can downwardly beyond the lower terminus 98 of the magnetic bars 96, the cans will be free to fall and will arrange themselves in a cell in the relationship indicated in Figure 5. The provision of the moving canvas belt 74 insures that the cans will move downwardly along the magnetic area and will not simply adhere thereto.

It will be noted that while side walls 91 must be provided on chute 90 to prevent cans from falling therefrom because it is positioned entirely above the carrier 20, the partition elements 30 will serve as end plates for the portion of the can feeding arrangement, viz., belt 74, within the carrier. Hence, the partition elements 30 need not be spaced apart to accommodate side plates on belt 74, but only sufficiently to accommodate the axial length of the cans C.

While a cell 34 is being filled, the operator may raise the body plate 70, conveyor frame 80 and belt 74 with the assistance of the counterweight 88. However, the chute 90, being supported by the supporting bracket 84 resting on the top of the carrier 20, will remain at the same angle and position with respect to carrier 20 because the slide rods 82 will move upwardly with frame 80 and through the plates 86 which are held down by the weight of chute 90. When the cell 34 has been entirely filled, the upward movement of the conveyor belt supporting frame 80 will bring a plate 100 at the lower end of the slide rods 82 into engagement with the underside of the chute supporting plate 86, so that chute 90 then will be raised off the top edges of the carrier. Either at this time or when the cell is completely filled with cans, the entire supporting structure for the belt 74 and chute 90 may be moved up above and clear of the carrier. In any event, whenever a cell 34 is filled, the operator may push the carrier 62 sufficiently along the track 60 to vertically align the conveyor belt 74 and chute 90 with the next cell to be filled. Hence, a carrier readily can be filled with cans in order and aligned arrangement at the normal production rate of a six ounce can making machine, namely, at approximately four hundred six ounce cans per minute.

It will be understood that because the motor supporting plate 70 is pivotally connected to counterweighted lever 66, an operator standing on a platform above or adjacent the carrier 20 may swing the conveyor frame 80 within a cell 34 so as to feed cans C to various portions of the cell as the cell fills. However, because the cans are round and are moving at high speed, they tend to seek their own level in a cell almost independently of the point of infeed with respect to the front or rear of a cell.

It will be understood that the filling procedure illustrated in Figure 5 also could be accomplished by the same conveyor and chute structure, but with the carrier 20 mounted on a carriage whereby it could be moved transversely of the direction of feed of chute 90 after the completion of the filling of a cell.

Figure 11 diagrammatically shows another arrangement whereby cans may be placed in a cell. By the arrangement there illustrated, the cans are sliding to the carrier 20 through a vertical chute 110 or a conveyor of the magnetic type shown in Figure 7, or even by a flight conveyor. In any event, the cans C discharged from the supply conveyor 110 will drop upon a strip of canvas 112 including a free dependent portion 114. The canvas strip 112 is supported at its ends by a wire frame designated 116 secured to the chute or conveyor means at 118. An arrangement of the type of Figure 11 will break the fall of the cans and, therefore, the conveyor device 110 need not be positioned as low in an empty cell 34 as is the case with the Figure 5 mechanism. Any side rails such as 119 may terminate above carrier 20.

The carrier 120 also shown in Figure 11 is provided with an inclined bottom wall 122, the structure of the carrier otherwise being the same as illustrated in Figure 1. If the carrier includes a bottom wall which is inclined downwardly toward its discharge outlet, the cans normally will roll downwardly to the low end of the bottom wall. Therefore, it usually is not necessary to move the can conveyor means to various positions between the front and rear walls of the carrier.

Figure 12 shows a carrier 20 of the level bottom wall type of Figure 1 and with a chute 124 inserted in a cell, the discharge end of the chute simply comprising a long, flat strip or plate 126 extending downwardly from an enclosed chute 128. Chute 128 may be provided with a pivotally manually operated closure 130 which can be swung downwardly from the position illustrated to stop the outfeed of cans. It will be noted that because the strip 126 is positioned between two partition elements 30 during the supply of cans to a cell 34, it is not necessary that any side guides or rails be provided on the strip. When it is desired to move the chute or conveyor 124 from one cell to another, the closure device 130 may be operated by hand to stop the outflow of cans.

As has been indicated above, a typical article carrier of the present invention as designed for handling can bodies, may be of a width of approximately four feet, an overall height of eight feet and a depth (from front to rear) of the order of seven-and-a-half feet. If the carrier is of this size, and is divided into cells 34 which are 4 1/16" wide divided by one-fourth inch material, each cell 34 will hold approximately two thousand six ounce cans of the type known as #202 cans. Number 202 cans have a diameter of 2 1/8" and a length of 3 7/8". Therefore, with the partitions 30 spaced 4 1/16" apart, the cells will be 3/16" wider than the length of the cans being handled. As a rule, 3/16" play between the cells and any packer's can is sufficient to enable the cells to be readily filled and discharged without danger of becoming canted.

If a carrier is provided with ten cells 34 of the size described above, the carrier will hold a total of twenty thousand six ounce cans.

Figure 7:
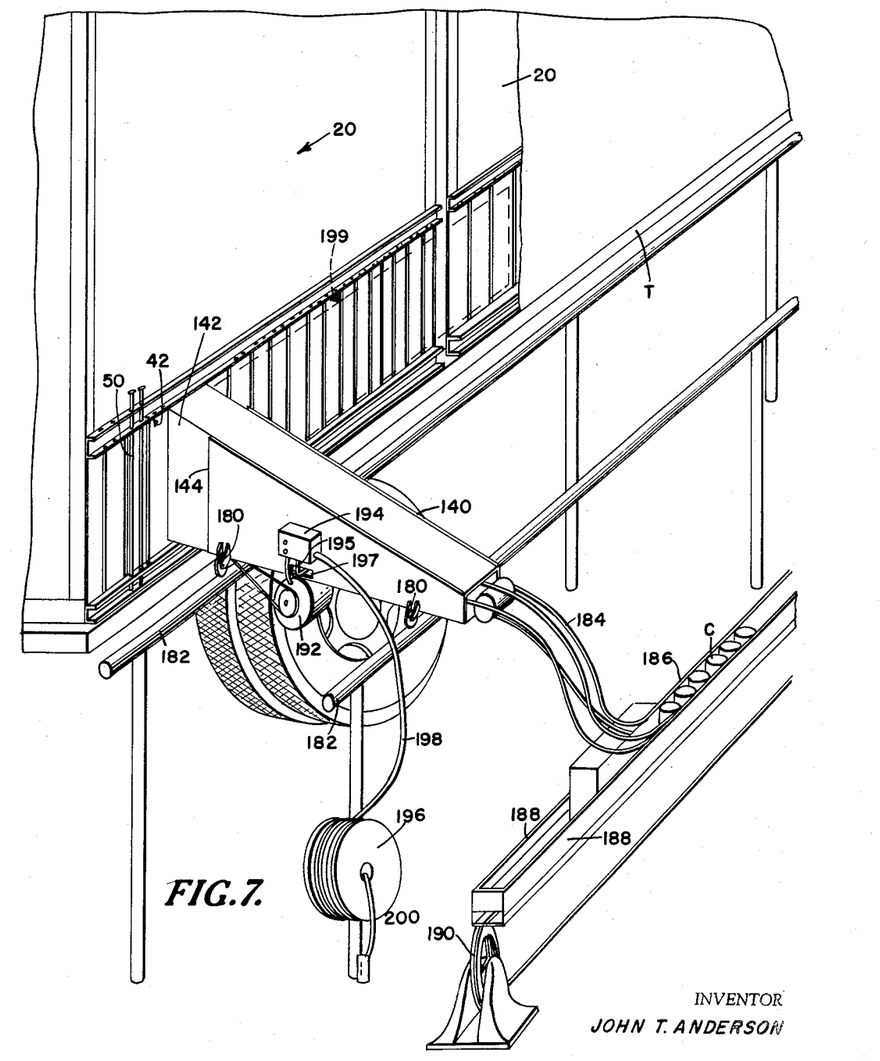
Figure 7 is a perspective view showing an apparatus by means of which articles may be removed from the carrier of the invention.
Figures 8, 9, 10:
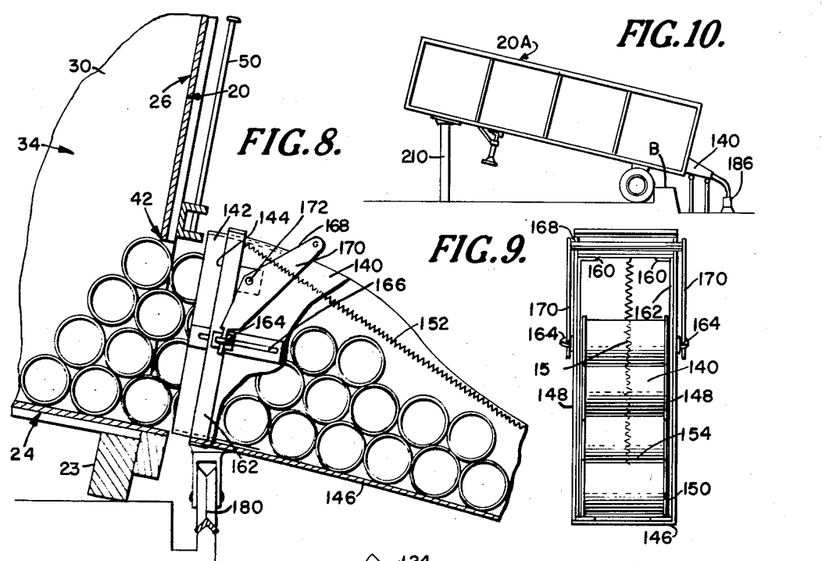
Figure 8 is a fragmentary detail showing the discharge element of Figure 7 but with the carrier inclined.
Figure 9 is an end view of the discharge element of Figure 8.
Figure 10 is a view on a reduced scale showing a procedure for unloading carriers.

Figures 7, 8 and 9 disclose an arrangement whereby cans may be discharged from an article carrier of the invention and which is of any of the types described above, as well as from the carriers hereinafter described in connection with Figures 15 to 28.

As best illustrated in Figure 8, when a carrier is to be discharged, it will be placed in discharge relationship with a discharge chute 140. By discharge relationship is meant either aligning the chute 140 with one of the cells 34 of a carrier and opening the closure element 50 of that cell, or, if the carrier is provided with a flat non-inclined bottom wall, placing the carrier in such position that its bottom wall is slightly tilted. The degree of inclination necessary to discharge the six ounce cans under discussion need only be about two-and-a-half inches per foot, that is, one to four. At this inclination, six ounce cans will discharge at the rate of two thousand per minute simply by gravity flow.

Referring now to the discharge chute 140, it will be observed that it is fitted with a bridging slide 142 adapted to close the space between the infeed end 144 of the chute body and the adjacent edge of the carrier discharge opening 42. Referring first to the body of the discharge chute, it is of U-shaped section to include a bottom wall 146 and side walls 148, the top being open. It will be observed that the infeed end 144 of the chute body is of a height corresponding to the diameter of several of the cans being handled, so that the cans will be quite free to move into the discharge chute. The outfeed end 150 is of a height only slightly greater than the diameter of a can being handled, so that only one can may move therefrom at a time. In actual practice, the cans move from the outfeed end 150 with sufficient rapidity that even though four cans simultaneously may be moving into the infeed of the chute 140, their movement from the outfeed end 150 will prevent any pile-up of cans in the chute 140. However, in order to avoid any pile-up of cans in chute 140 and also to urge the cans into one tier at outfeed end 150, a coil spring 152 may be provided to extend between a crossbar at the infeed end of the discharge chute to a crossbar 154 above the discharge end 150 of the chute.

Referring now to the slide bridge 142, this is of U-shaped form to fit within the infeed end 144 of chute 140, the top of the bridge being open except for an inturned flange 160 extending from each side wall 162. Each side wall of the slide bridge 142 has an apertured ear 164 fixed thereto and extending outwardly through a slot 166 in the side wall 148 of the chute body 140. A handle 168 of U-shaped form to include side pieces 170 has each side piece pivoted on a pin 172 extending outwardly from the corresponding side wall 148 of chute 140. The free ends of the handle side pieces 170 are slidably engaged in the ears 164. By this arrangement, swinging movement of the handle 168 will cause the slide bridge 142 to move with respect to the discharge chute 140 and an adjacent carrier 20 to close any gap between the two.

As best illustrated in Figure 7, the discharge chute 140 is provided with pairs of rollers 180 adapted to ride on a trackway 182 at a receiving plant. For example, a truck or truck-trailer generally designated T of flat body type carrying three or four carriers 20 may draw up alongside the rails 182. The operator may position the sliding bridge 142 diagrammatically shown in Figure 7 to close any gap between the infeed end 144 of the discharge chute 140 and the adjacent discharge opening 42 of the carrier. Then the closure device 50 may be removed from the discharge opening 42 of the cell 34 with which the discharge chute 140 is aligned and the cans will move into the chute 140.

The outfeed end of discharge chute 140 may have can guiding strips or rails 184 secured thereto and which are so shaped as to cause the cans to spiral from a horizontal position to a vertical position. The spiraling guide 184 will be fixed to the discharge chute and is slidably supported above a driven conveyor 186 on which the spiral will place the cans in upright position. Because the spiral guide 184 is slidably related to the fixed vertical guide plates 188 of conveyor 186, as one cell of carrier 20 is emptied, discharge chute 140 and the attached spiral 184 may be moved along the conveyor 186 to feed cans to the latter at some point between its idler pulley 190 and its opposite and driven end. As cans flow from spiral guide 184 they will be moved away by conveyor 186.

Conveyors of the type indicated at 186 are conventional equipment at the can receiving platform or area of a packing plant and are adapted to receive cans placed therein by various conventional feeding means. For example, by prior practise, the cans have been placed upright in the usual conveyor 186 by an apparatus known as an unscrambler and into which cans have been dumped at random, conveyor 186 then moving the cans to filling and seaming apparatus. Therefore, the structure shown in Figure 7 primarily involves elimination of the unscrambler from the packing plant and the substitution of the track rails 182, discharge chute 140 and its accompanying spiral 184. These parts need be the only new permanent equipment provided at the packing plant, the cans being delivered to the packing plant by the carriers such as 20 supported on trucks.

If desired, a discharge chute such as 140 may be used to deliver the cans from a portable carrier such as has been heretofore discussed, the chute 140 then feeding the cans into the top of a less portable and larger bin or carrier of the same structure as the carrier 20 and which larger carrier is permanently installed at the packing plant. By such an arrangement, cans could be delivered to the packing plant in portable carriers 20 at any desired time and placed in the permanent carrier or bin for a reserve stock. Then, when it is desired to fill the cans, the permanent bin could discharge its cells into the conveyor 186.

In order that cells may be discharged as rapidly as possible, an electric motor 192 may be mounted on the underside of the chute 140, motor 192 being adapted to drive wheels, not shown, to engage the rails 182. In addition, automatic switch means 194 may be connected to motor 192, switch mechanism 194 being powered by current supplied from a reel 196 through a flexible conductor 198, the other end of conductor 198 being connected to a source of power 200. The switch mechanism 194 may include a pivoted arm such as 195 extending through a slot 197 in the side wall of chute 140. When the operator starts the flow of cans from the first cell, he may close a manual switch in circuit with the switch controlled by arm 195. As long as cans move through the chute 140 the circuit will remain open but when the movement of cans from one cell 34 ceases, arm 195 will close the circuit to motor 192 and it will be powered to drive the chute 140 to the next cell. The power could be cut off either by a trip on the cell or by means responsive to a given drive period of the motor 192. In order to render the entire discharge operation automatic, a vane or stop plate such as shown in dotted lines at 199 in Figure 7 could extend from one side wall of the infeed edge 144 of chute 140 or from the side edges of the bridge slide 142. In such case, all of the gate pins 50 of a carrier 20 may be removed at the same time so that cans will discharge from a cell 34 as soon as discharge chute 140 has moved into alignment therewith.

In more detail, assume that in Figure 7 the first cell emptied is the one shown at the left of the figure, and that the sliding bridge 142 has a plate 199 extending from its right-hand side to fully cover and close the discharge apertures 42 of all of the other cells. With this arrangement, as soon as the carrier 20 is brought into contact with dicharge chute 140 all of the closure pins 50 may be lifted from the apertures 42 because the plate 199 will close all of the cells 34 except the one at the extreme left. As soon as all cans are discharged from the left-hand cell and such discharge stops, switch mechanism 194 may operate as described above to power the motor 192 to move the discharge chute 140 and sliding bridge 142 into alignment with the next cell to the right because, with all of the closures 50 removed, each cell will discharge in succession without further attention on the part of an operator.

Figure 10 shows a procedure which may be followed if the entire body 20A of a truck trailer is built in accordance with the cellular carrier structure of the present invention. Such a body 20A is shown in top elevation in Figure 13, from which it will be noted that the cells 34A are formed by partition elements 30A extending the entire length of the truck trailer. The procedure illustrated in Figure 10 involves backing the rear wheels of the truck up against a barrier B to thereby bring the rear ends of the cells 34 adjacent a discharge chute 140 combined with a conveyor 186 as shown in Figure 7. The outfeed end of the carrier 20A may be of the same form as illustrated on the smaller carriers heretofore discussed and each cell 34A thereby may be successively discharged to the conveyor 186 or to a permanent bin also of the cellular type disclosed herein.

Figure 13:
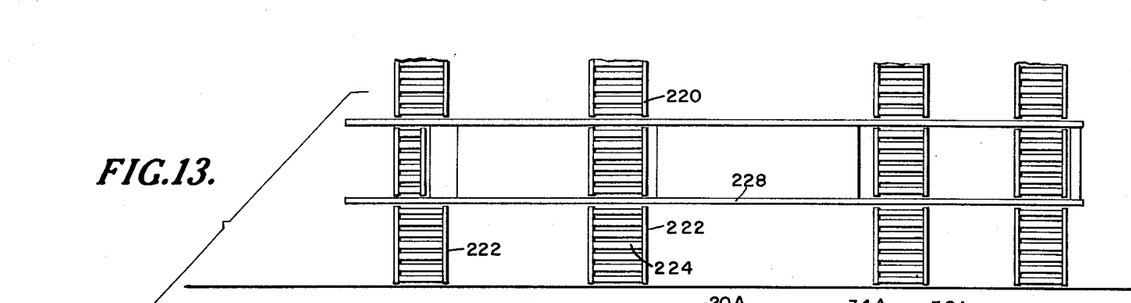
Figure 13 is a top plane view showing a system and station for unloading carriers of the invention.

A conventional truck trailer of the construction illustrated in Figure 13 could accommodate from one hundred and sixty thousand to two hundred thousand six ounce cans of the type discussed above.

It will be noted from Figure 10 that the truck trailer body 20A has been disconnected from its tractor after being positioned above a vertically movable hydraulically operated piston 210. With the body 20A provided with a flat bottom rather than an inclined bottom such as shown in Figure 11, operation of the piston 210 will raise the truck to the proper angle to cause its cells to be discharged.

Figure 13 discloses a handling station for truck trailer bodies which are constructed in accordance with the present invention. The truck provided with the carrier 20A is shown positioned alongside a platform generally designated 220 and including a plurality of skidways 222 formed by rotatable rolls 224. By suitable means, the body 20A may be moved laterally off the supporting frame 226 of the truck so that it will stand upon the four skidways 222 of platform 220. Then a vertically movable frame 228 of sufficient size to support the carrier 20A may be elevated in such a manner as to cause the carrier 20A to be tilted to the relationship shown in Figure 10. It will be understood that a discharge mechanism such as shown in Figure 10 then will be provided at the right end of the platform 220.

Figure 14:
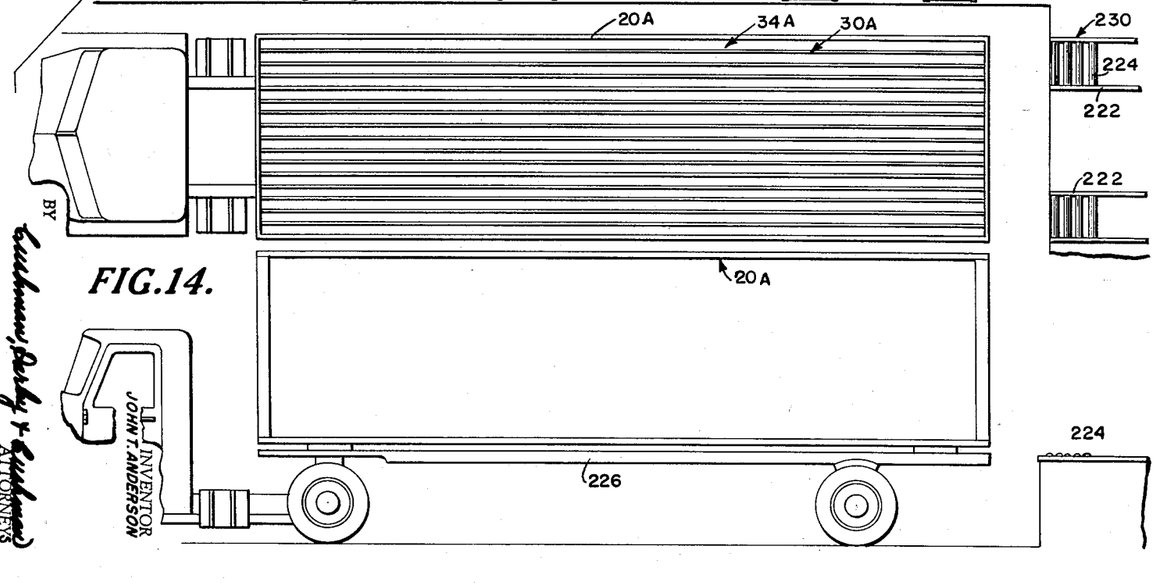
Figure 14 is a side elevation of the equipment of Figure 13.

Figure 13 also indicates a second platform 230 against which a truck provided with a carrier body 20A could be backed. Then the carrier 20A may be moved to the right as viewed in Figure 14 and on to the platform 230, which is of the same design as 220 but has its skidways arranged longitudinally of the carrier 20A to be supported thereon. Then carrier 20A can be tilted or otherwise arranged for discharge of cans.

It will be observed that when the platforms 220 and 230 are combined as shown in Figure 13, a truck may place its carrier 20A on the platform 220 and then return to the can plant for a second filled carrier 20A. The second carrier 20A may be positioned upon the platform 230. Assuming that the first carrier at platform 220 now has been emptied, it can be replaced upon the truck and taken back to the can plant for refilling. In this way, two carriers 20A and one truck may provide a continuous supply of cans for a packing plant without any manual handling of cans or carriers or the use of any unscramblers.

It will be understood that the platform 230 will have discharge equipment of the type illustrated in Figure 7 at its right-hand end, not shown.

It will be noted that the carrier such as 20 could be positioned by a fork truck upon a fixed platform alongside the discharge mechanism illustrated in Figure 7. If the carrier is of the flat bottom type, the fixed platform might be provided with either portable or fixed jacks to tilt the carrier to the proper angle to cause the contents to discharge into chute 140. If the carrier is of the type shown at 20A in Figures 13 and 14, that is, is of the size of a truck body or other large vehicle and has its cells flat-bottomed and extending the entire length of the carrier, elevating means could be provided on the truck to tilt the carrier. If carriers of the smaller size are mounted upon a truck body so that the cells extend transversely of the truck, the individual carriers also could be tilted by power means on the truck if the carrier bottoms are of the flat type.

Figures 15 to 28 illustrate the detail form of a carrier 20B which has numerous constructional advantages but is generally similar to the carrier 20 of Figure 1 except that carrier 20B would be provided with an inclined bottom.

Figures 15, 16, 17, 18, 19, 20, 21, 22, 23:
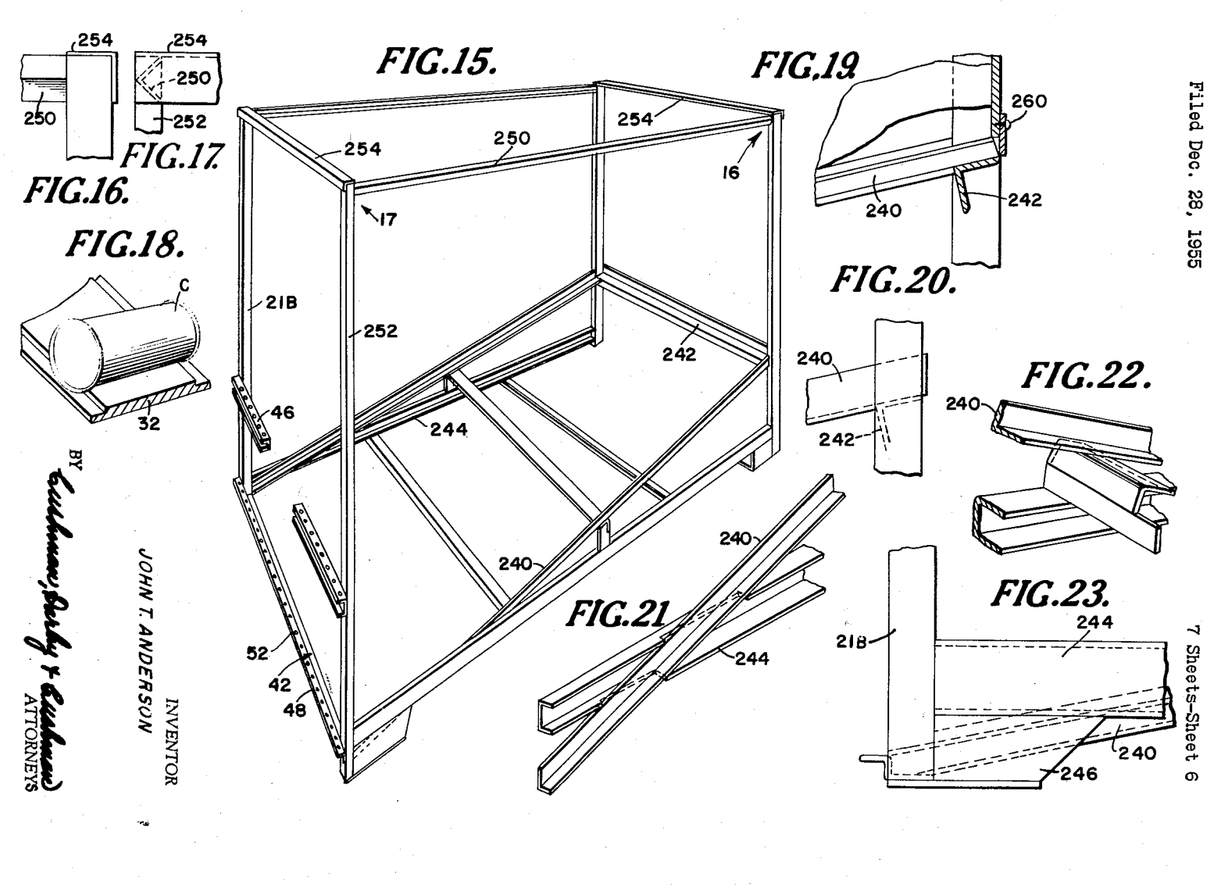
Figure 15 is a perspective view showing the frame of a modified form of carrier.
Figure 16 is a fragmentary detail view of the upper right-hand portion of Figure 15 as indicated by the arrow 16 on the latter figure.
Figure 17 is a fragmentary detail of the upper left-hand corner of the Figure 15 view, as indicated by the arrow 17 of the latter figure.
Figure 18 is a diagrammatic view showing the relation of a can body to the bottom wall of a cell.
Figures 19 to 23 are fragmentary details of various portions of the Figure 15 structure.
Figures 26, 27, 28:
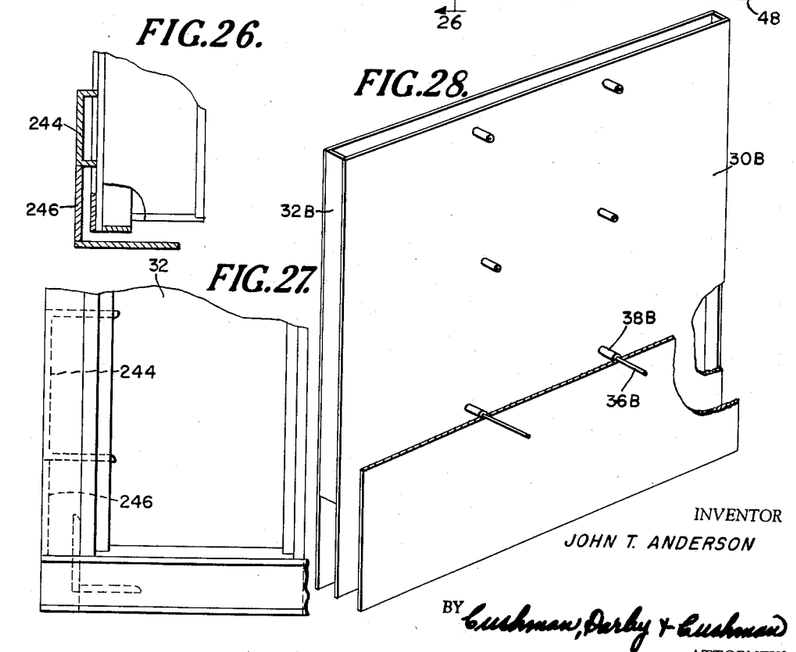
Figure 26 is a detail sectional view on the line 26—26 of Figure 24.
Figure 27 is an enlarged fragmentary detail view of the lower left-hand portion of Figure 25.
Figure 28 is a diagrammatic perspective view showing the relative position of the partition elements, spacers, and rod-holding rods as mounted in both Figures 1 and 15.

As shown in Figure 15, the frame 21B of the carrier under discussion is formed of angle irons welded together. The bottom wall of the carrier 21B will be supported on frame members 240 best illustrated in Figure 20. Figure 19 shows the manner of supporting the member 240 with respect to a slightly tilted angle member 242 which extends across the rear portion of the frame. The same arrangement appears in Figure 20. Figure 22 shows the manner of supporting the inclined bottom frame member 240 midway of its length and Figure 21 shows how the member 240 may extend through the bottom side frame member 244 near the front of the frame. Figures 23, 26 and 27 shows the manner of connecting the inclined frame members 240 to the front foot 246 of the frame.

Figures 16 and 17 illustrate how the top side frame members 250 are connected to the vertical frame members 252 and the front and rear top frame members 254. It will be noted that the frame members 250 are formed of angle material but are so positioned that no surface thereof will extend inwardly past the inner surface of the vertical frame members. By this arrangement, the overall size of the entire frame may be held to a minimum and yet no surfaces will overhang any partitions or side walls to interfere with removal of the latter.

Figures 24, 25:
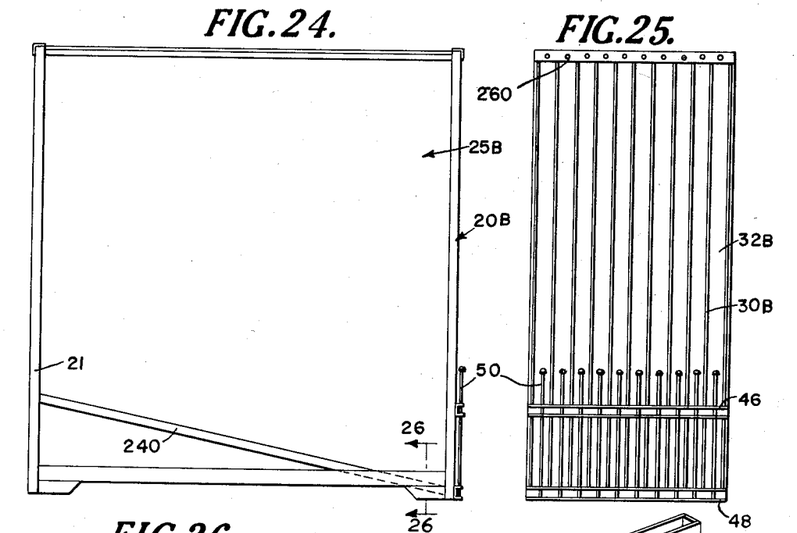
Figure 24 is a side elevation of the Figure 15 carrier.
Figure 25 is a front elevation of the Figure 24 carrier.

Figure 24 is a side elevation of a carrier including the frame 20B. It will be observed that the side walls 25B have their lower edges so cut that they will rest on the inclined bottom frame members 240. Figure 25 is a front view of the carrier of Figure 24. As explained in connection with the Figure 1 carrier, the spacing members 32B alternate with the partition elements 30B to thereby space the latter apart the proper distance. This arrangement also is illustrated in Figure 28 which shows a further arrangement of the securing rods 36B and spacers 38B which hold the partitions securely held together. The wood spacer members 32B may be held firmly in position by wood screws extending through apertures in the front and rear frame members at such points as are found necessary and the same is true of the spacer members included in the bottom wall structure. It will be understood that removable spacers of any of the carriers could be removably held in place by wood screws, bolts, or the like.

The terminology used in the specification is for the purpose of description and not of limitation, the scope of the invention being indicated in the following claims.

I claim:

1. In a conveyor structure, a trackway adapted to be supported in a horizontal plane spaced above an article carrier supporting surface, a carriage mounted for movement lengthwise of said trackway, a lever pivoted to said carriage on a substantially horizontal axis, a vertically disposed endless conveyor element having a vertical run for downward movement of articles, said element being pivotally connected to said lever on an axis parallel to and spaced from the pivotal axis of said lever to said carriage, means to feed articles to said vertical run of said conveyor element, means associated with said run to cause articles to move downwardly therewith, and means adjustably connecting said article-feeding means and said conveyor element to each other thereby permitting a variance at the point at which articles are transferred from said feeding means to said conveyor element and a variance in the angular relationship between said feeding means and said conveyor element while said feeding means maintains a substantially constant angular relationship with the article carrier.

2. A structure of the character described in claim 1, including means to assist in movement of said lever about its pivot to said carriage.

3. A structure of the character described in claim 2, wherein said means to assist in movement of said lever about its pivot includes a counterweight carried by said lever for counteracting weight of said conveyor element.

4. A structure of the character described in claim 1, including means to operate said endless conveyor element, said conveyor element operating means including a motor operatively carried by said lever and movable therewith.

5. A structure of the character described in claim 1 wherein said means to cause articles to move downwardly with said run includes a magnetic element.

6. A structure of the character described in claim 1 wherein said means adjustably connecting said conveyor element to said article feeding means includes a bearing member adapted to rest upon an article carrier, said bearing member being vertically movable with respect to said conveyor element.

7. A structure of the character described in claim 1 wherein said means adjustably connecting said conveyor element to said article feeding means includes a bearing member adapted to rest upon an article carrier, said bearing member being vertically movable with respect to said conveyor element, and said article feeding means having its outfeed mounted on said bearing member.

References Cited in the file of this patent

UNITED STATES PATENTS

| | | | |
|---|---|---|---|
| 247,316 | Crane | Sept. 20, | 1881 |
| 486,919 | Winget | Nov. 29, | 1892 |
| 1,243,406 | Hawthorne | Oct. 16, | 1917 |
| 1,300,438 | MacLennan | Apr. 15, | 1919 |
| 1,387,309 | Prater | Aug. 9, | 1921 |
| 1,406,963 | Angus | Feb. 21, | 1922 |
| 1,524,459 | Smith | Jan. 27, | 1925 |
| 1,773,646 | Skov | Aug. 19, | 1930 |
| 2,431,265 | Madsen | Nov. 18, | 1947 |
| 2,486,733 | Buccione | Nov. 1, | 1949 |
| 2,497,162 | Findlay | Feb. 14, | 1950 |
| 2,664,189 | Hager | Dec. 29, | 1953 |